United States Patent Office 3,321,827
Patented May 30, 1967

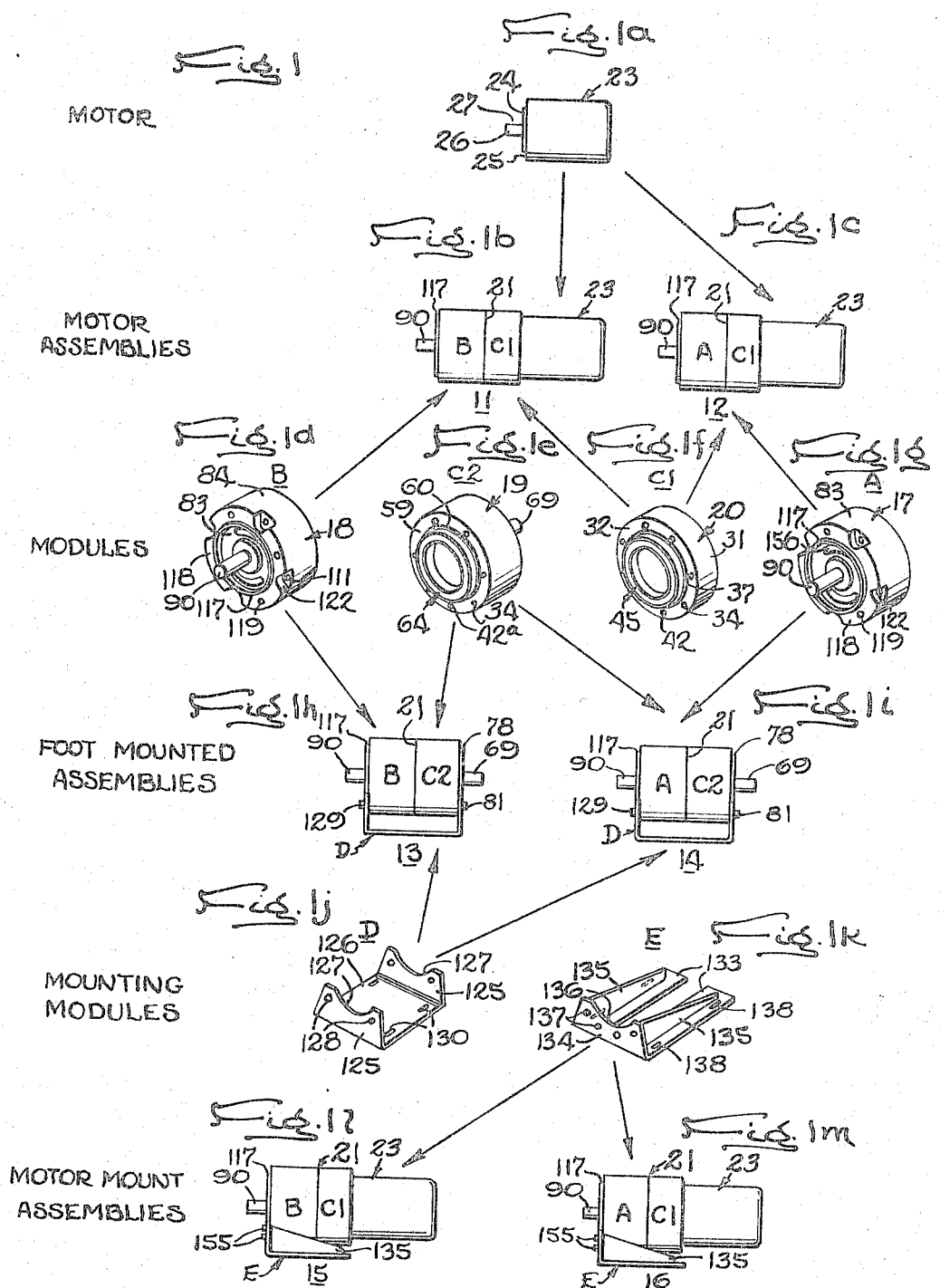

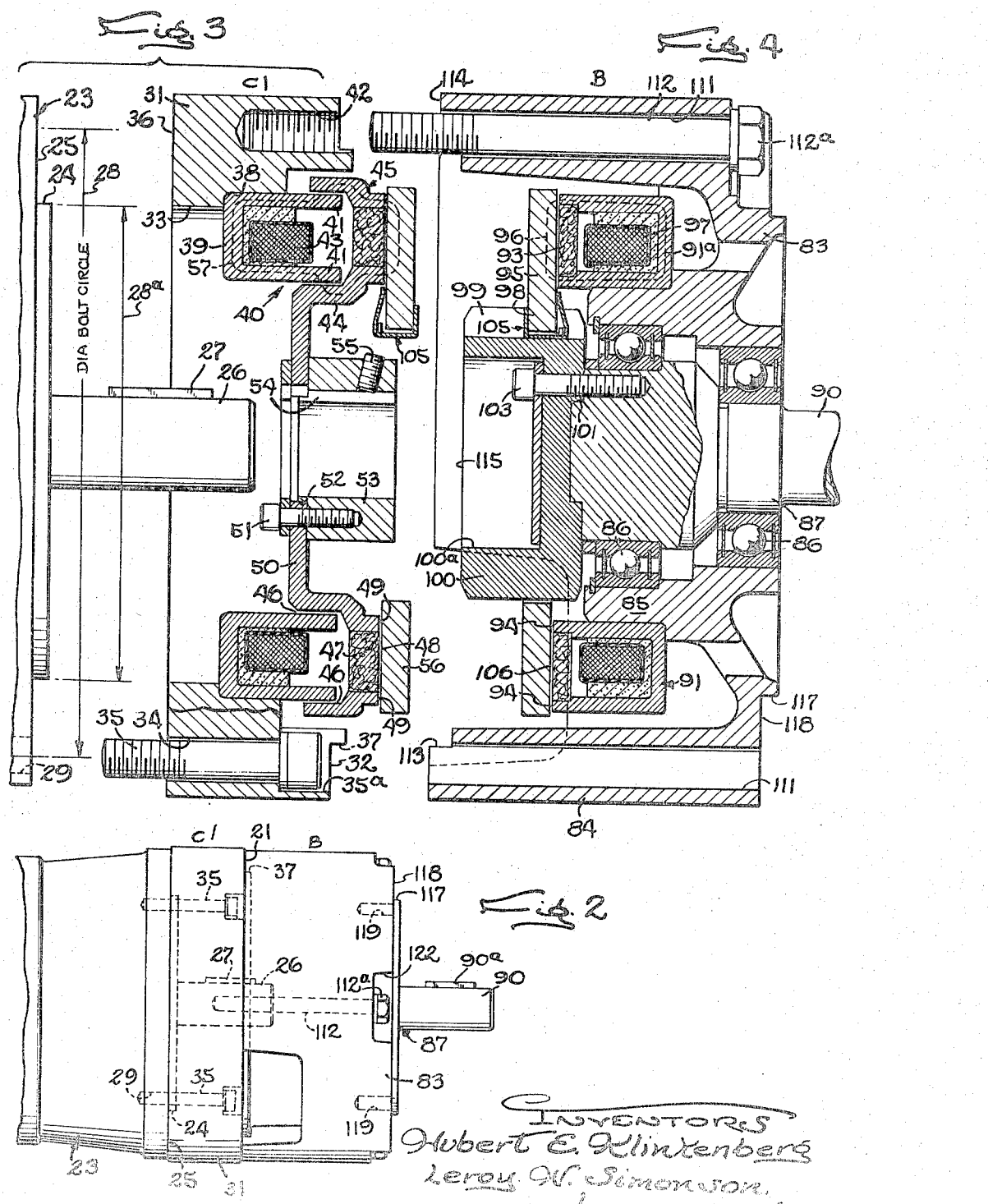

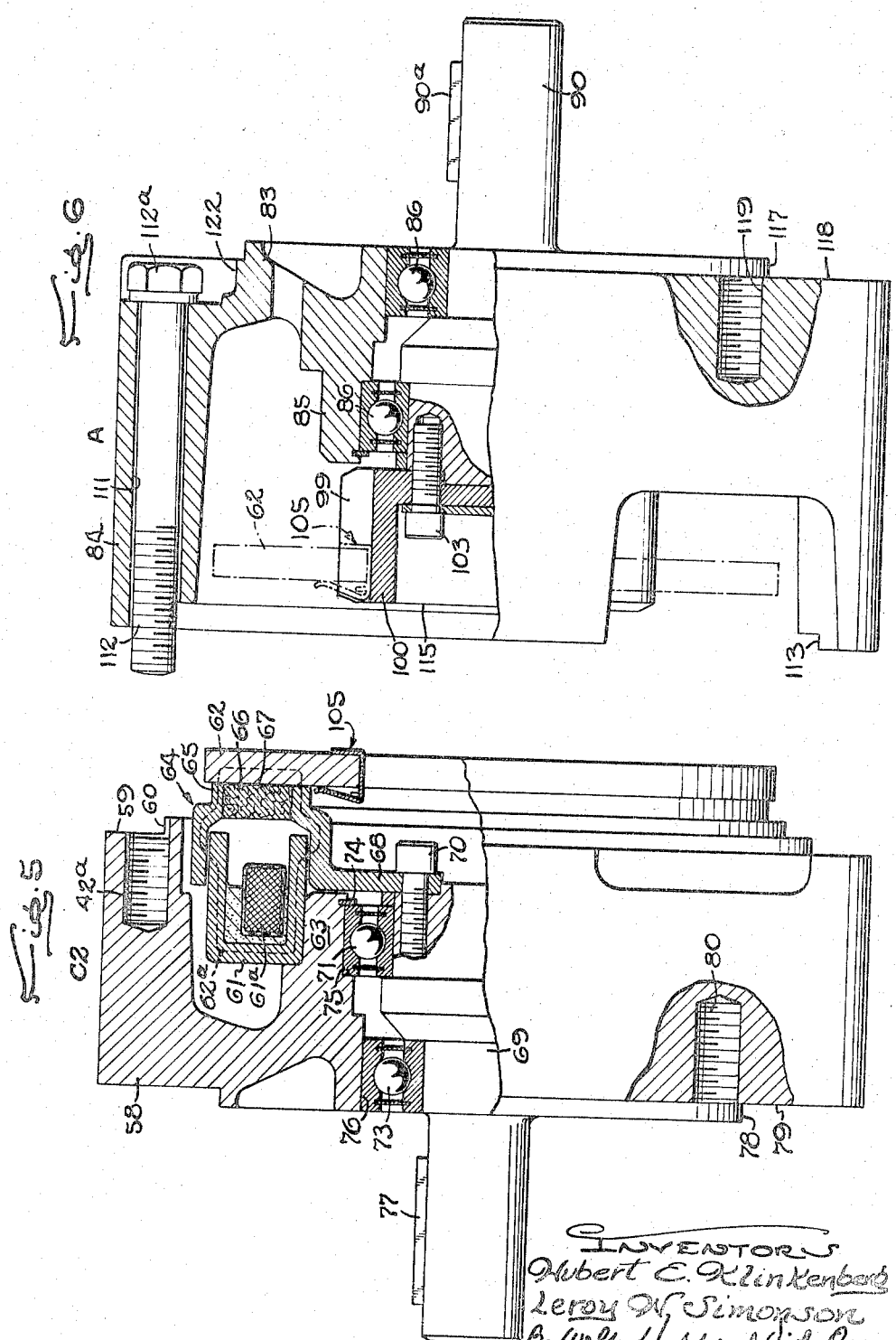

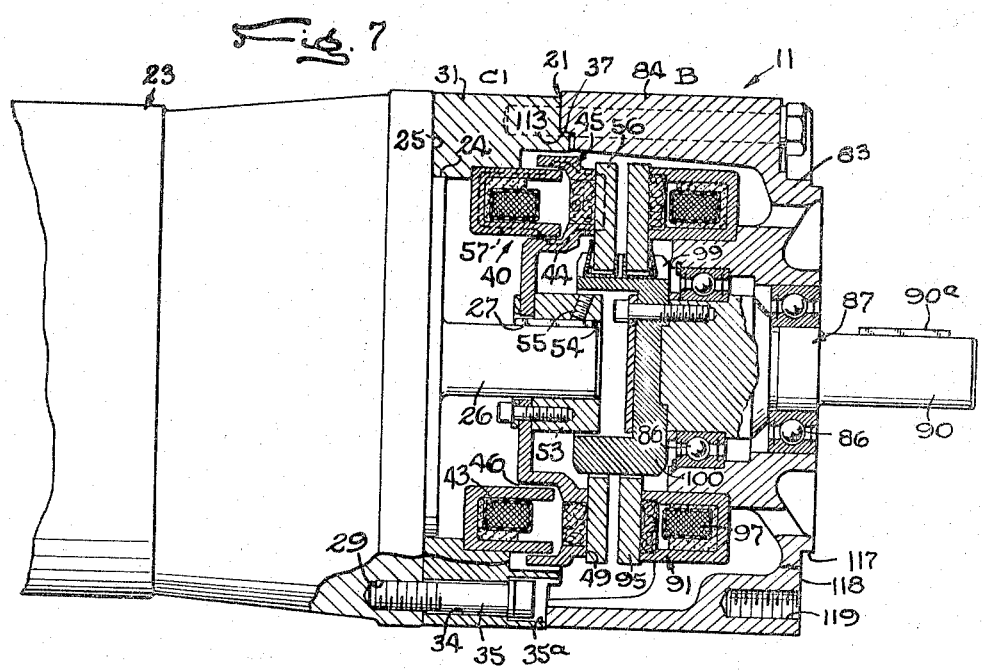

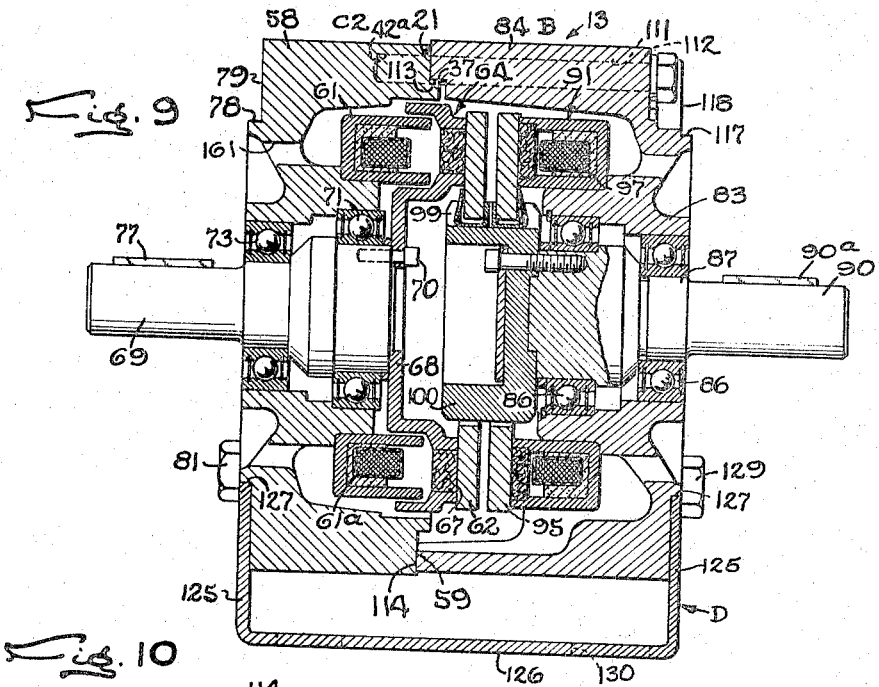

3,321,827
METHOD OF CONSTRUCTING MAGNETIC
FRICTION COUPLINGS
Hubert E. Klinkenberg and Leroy W. Simonson, both of Beloit, Wis., assignors to Warner Electric Brake & Clutch Company, South Beloit, Ill., a corporation of Delaware
Original application July 27, 1964, Ser. No. 385,190. Divided and this application Apr. 22, 1966, Ser. No. 544,599
2 Claims. (Cl. 29—469)

This application is a division of our copending application Ser. No. 385,190, filed July 27, 1964, now abandoned.

This invention relates to the manufacture of magnetic friction brakes and clutches or a combination thereof of the type commonly used in building automatic machinery and operable in service to control the motion of various machine parts. For machines manufactured in large quantities, special couplings with self-contained mountings are purchased in quantity for direct attachment to the machines. For individual machines or those made only in small quantities, the common practice has been for the end use manufacturer to purchase standardized motors, separate clutches, brakes, gear reducers, etc., and then proceed with special constructions for coupling the units together and properly mount the same for the intended use. This prolonged and costly procedure has been followed in spite of the fact that the end faces of electric motors have long been standardized by the National Electrical Manfacturer's Association (NEMA) for the mounting of gear boxes or other power take-off devices directly on the motor housing.

The object of the present invention is to provide a novel method for the quick and convenient building of magnetic friction couplings "modular fashion," that is to say, by preforming a stock of power input and power output modules or units each adapted to perform assigned functions when assembled with a second one of the modules, selecting from said stock a combination of said input and output modules which will perform a desired clutching and/or braking function, assembling and bolting the selected modules together to form a self-containing transmission assembly ready for convenient attachment to a machine.

The invention also resides in the novel manner of distributing between the input and output modules the parts which coact in the final assembly to perform the various clutching, braking, mounting and joining functions.

Other objects and advantages of the invention will become apparent from the following detailed description taken in connection with the accompanying drawings, in which FIGURE 1 is a composite view of the magnetic friction coupling modules contemplated by the present invention illustrating diagrammatically the manner in which these are combined to form various clutch-brake assemblies, FIGS. 1d, e, f and g showing the individual modules in perspective while a standard electric motor is shown in elevation in FIG. 1a and the various possible assemblies of the modules are similarly shown in FIGS. 1b, c, h, i, l and m.

FIG. 2 is a fragmentary elevational view of a clutch-brake motor mounted assembly.

FIG. 3 is a diametrical cross-sectional view of one clutch module illustrating the manner of its association with the end face of a motor.

FIG. 4 is a diametrical sectional view of the brake module.

FIGS. 5 and 6 are fragmentary diametrical sectional views of another clutch module and the output shaft module.

FIGS. 7 and 8 are diametrical sectional views of motor mounted clutch-brake and clutch assemblies formed in accordance with the present method.

FIGS. 9 and 10 are similar diametrical sections of clutch-brake and clutch assemblies foot mounted.

*The invention in general*

The ready availability, quick assembly and convenient mounting of the different magnetic clutch and brake combinations as contemplated by the present invention is achieved by first preforming and stocking standardized modules or units indicated as A, B, C1, C2, D and E in FIG. 1 and adapted to be combined selectively in pairs to form the different assemblies indicated generally by the numerals 11–16. Each assembly includes a power input or clutch module C1 or C2 and a power output module A or B, the latter providing a brake for the clutch-brake combinations 11 and 13. The selection of the clutch module C1 or C2 is determined by the manner in which the two module assembly is to be mounted for service use. The C1 module is used in the clutch or clutch-brake assemblies 11 and 12 which are to be supported directly on a motor end face of standard NEMA construction and also where the assembly is attached to such a motor but supported by the angular motor mount bracket E as indicated at 15 and 16.

In each of the modules A, B, C1 and C2, the operating parts are enclosed within and rotatably mounted on generally cylindrical casings 17, 18, 19 and 20 (FIGS. 1d to g) contoured at their adjacent ends for accurate telescoping of each input-output pair at a joint 21 which is concentric with the axes of the input and output shafts and also accurately positioned axially relative to the rotary pole faces of the magnet carried by the power input module and the armature carried by the power output module. Thus, as an incident to telescoping of the two casings in abutting relation and bolting the same together, the input and output shafts of the two are alined automatically and the friction clutching faces are simultaneously brought into association for proper axial gripping engagement and disengagement under the control of the magnet energization.

While the contemplated modular method of building magnetic clutches is applicable to couplings having rotatable magnets, it is particularly suited to those of the stationary field type in which an annular magnet is fixed in the module casing and coacts with concentric pole pieces on a revolving rotor to form a toroidal flux path which is completed by a relatively flat armature ring mounted on the other module.

*NEMA motors*

Motors 23 constructed in accordance with well established NEMA standards have a narrow cylindrical male pilot 24 projecting from a generally flat end or shoulder 25 of the motor casing and precisely concentric with the projecting end 26 of the motor shaft which is of standard size and length and equipped with a key 27 of standard dimensions. In most of the Type C faces, the pilot diameter 28a is smaller than the bolt circle 28 (FIG. 3) around which threaded bolt holes are spaced equidistantly, there being four or eight holes depending on the motor size. In other Type C constructions, the pilot may be larger than the bolt circle while in the Type D so-called flange mounting, the pilot 24 and the bolt holes 29 are formed in a narrow radial flange on the motor. The dimensions of the parts above described as well as their relative spacing are highly standardized for various sizes of motors as set forth in publications of the National Electrical Manufacturer's Association, New York.

Clutch module C1

As best shown at the left in FIG. 3, this module includes a generally cylindrical ring-like casing 31 having a central bore 33 at one end constituting a female pilot and adapted to telescope closely around the male pilot 24 of a NEMA motor when the casing end 36 is brought into abutment with the end face 25 of the motor as shown in FIGS. 7 and 8. Holes 34 paralleling the casing axis extend through the casing for receiving cap screws 35 by which the casing may be clamped against the motor casing, the heads of the screws then being disposed in countersunk recesses 35$^a$ in the inner face 32 of the module casing. The number, size and spacing matches a standard NEMA construction. Beyond the screw heads, the casing 31 is formed around its inner end 32 with an annular male pilot 37 concentric with the module axis and adapted to telescope closely with the inner end of the associated power output module to form the joint 21 above described. For a purpose to appear later, the pilot 37 is of a diameter somewhat different, larger in this instance, than the pilot 24 on the standard NEMA motor.

To provide for bolting the casing end 32 against the inner end of the casing of an output module A or B by cap screws 112 as described later, parallel and internally threaded blind end holes 42 are formed and equidistantly spaced around the casing. Each hole is disposed at the same radius as and midway between adjacent ones of the holes 34, thus matching the spacing of the NEMA motor holes 29.

Disposed in a countersunk recess 38 in the module casing 31 is the annular core 39 of the clutch magnet 40 which is cemented, brazed or otherwise fixed to the casing. The core is of U-shaped cross-section having concentric pole pieces 41 enclosing a multiple turn winding 43 and terminating about in the plane of the pilot 37. Telescoped with the end portions and around the inner and outer surfaces of the pole pieces 41 are the pole pieces 44 of the magnet rotor 45 separated from the magnet by narrow radial air gaps 46. The annular pieces 44 are rigidly joined together by a ring 47 of high reluctance or non-magnetic material whose end face 48 is flush with the rotor pole faces 49 and cooperates therewith to form one friction face of the clutch.

Integral with the inner end of the inner rotor pole piece is a radial flange 50 which is piloted at 52 (FIG. 3) onto and against the inner end of a sleeve 53 and clamped to the latter by a plurality of cap screws 51. This sleeve forms the hub of the rotor and is sized to telescope closely over the end of the motor shaft 26 and internally splined at 54 to receive a substantial length of the key 27 (see FIG. 7) when the module C1 is bolted to the end of the motor. The position of the hub and magnet along the motor shaft is fixed by tightening a set screw 55.

With the magnet and rotor thus constructed, the desired narrow and uniform width of the two radial gaps 46 is established and maintained automatically as an incident to assembly of the C1 module on a motor of standard NEMA construction. That is to say, the transaxial position of the magnet poles 41 is fixed by the telescoping of the casing 31 onto the motor pilot 24 while the positions of the rotor pole pieces 44 are fixed by the telescoping of the hub 53 onto the motor shaft 26.

In the two module clutch assembly (see FIG. 7), the magnet core and rotor cooperate with a flat armature ring 56 of magnetic material which spans the pole faces 49 and completes a flux circuit 57 of toroidal shape. Thus, the rotor and armature faces are drawn into axial gripping engagement upon energization of the winding 43, the clutch being released when the magnet is deenergized.

Clutch module C2

This module is used for clutches and clutch-brake combinations which are to be mounted separately on a base module or foot bracket D as shown in FIGS. 9 and 10.

Like the C1 module, it comprises a single piece casting defining a generally cylindrical centrally apertured casing 58 whose inner end 59 terminates in a pilot 60 of the same size as the pilot 37 above described. Internally threaded holes 42$^a$ are formed in the inner end of the casing the same as the holes 42 in the C1 casing to receive screws 112 by which the casing can be bolted to the casing of an output module.

A magnet 61 having a core of U-shaped cross-section and the same size as the C1 magnet and enclosing a winding 61$^a$ is telescoped over the exterior of and suitably fixed to the outer end portion of an axially projecting flange 63 which terminates short of the pilot 60. A rotor 64 having pole pieces 65 telescoped loosely around and within the outer and inner magnet poles and rigidly joined by a nonmagnetic friction ring 66 defines with the pole faces an axially facing friction surface 67 located in the same position relative to the end of the casing as the surface 48, 49 of the C1 module. In the final clutch assembly (FIGS. 9 and 10), the face 67 is adapted for axial gripping engagement with a flat ring armature 62 of the same construction as the armature 56 and completes through the magnet a toroidal flux circuit 62$^a$.

An inturned radial flange 68 integral with the inner pole piece of the rotor 64 is spaced inwardly from the casing end and clamped against the inner end of a shaft 69 by screws 70 whose heads are axially spaced inwardly from the plane of the rotor face 67. The shaft is journaled accurately in the casing through axially spaced anti-friction bearings 71 and 73 pressed onto the shaft, the larger one being around the enlarged inner end of the shaft between a snap ring 74 and a shoulder 75. The other is disposed into the outer end of a central recess 76 in the casing and pressed onto the shaft about midway between the ends of the latter. An outwardly projecting end portion of the shaft carries a key 77 and preferably corresponds in size and length to the standard NEMA shaft 26 above described.

To facilitate mounting of the C2 module on the foot bracket D, an outwardly projecting narrow male pilot 78 is formed around the outer end face 79 of the casing 58 and has the same diameter and width as the pilot 26 on the NEMA motors. The casing end around this pilot is formed with NEMA sized and spaced blind end holes 80 (FIG. 5) threaded to receive clamping screws 81 (FIGS. 9 and 10).

Brake module B

This module may be combined with either of the clutch modules C1 and C2 for the clutch-brake combinations 11, 13 (FIGS. 1, 7 and 9). As shown in FIG. 4, the module includes a ring-like casing 83 having a generally cylindrical outer flange 84 and a shorter inner or hub flange 85. The latter supports two axially spaced anti-friction bearings 86 in which is journaled the intermediate portion of an output shaft 87. This shaft and its bearings are duplicates of the shaft 69 of the clutch module C2 above described. The outwardly projecting end portion 90 is equipped with a key 90$^a$ dimensioned to correspond precisely to the standard NEMA motor shaft 26.

To enable the casing 83 to be bolted to either clutch module C1 or C2, parallel holes 111 equidistantly spaced around the casing axis to match the NEMA motor holes 29 are extended through the flange 84 to receive cap screws 112 above referred to. In the tightened condition of these screws, the heads 112$^a$ thereof are preferably disposed in recesses 122 countersunk in the outer end of the casing (FIG. 4) while the screw ends project beyond the end 114 of the casing flange 84.

Surrounding the inner flange 85 and pressed on or otherwise rigidly secured thereto is a magnet 91 having a core 91$^a$ of U-shaped cross-section with pole pieces spanned by a ring or a series of segments 93 of wear resistant friction material cooperating with the pole piece ends to form a friction face adapted for axial gripping engagement with an armature 95. The latter spans the pole faces 94 and cooperates with the magnet to complete a toroidal path 96 threaded by flux upon energization of of a winding 97 secured to and disposed between the pole pieces of the magnet core 91a.

The armature comprises a generally flat ring of iron having angularly spaced and inwardly projecting radial teeth 98 fitting closely in but slidable along spline grooves 99 angularly spaced around the exterior of a collar 100 which may be composed of molded plastic material. The collar projects axially substantially beyond the brake armature so that the spline grooves thereof may also support the armature 56 or 62 of the C1 and C2 clutch units as will appear later. The bore 100a of the collar is somewhat larger in diameter than the inner end of the hub 53 of the C1 module so that the collar will telescope freely over the latter when clutch and brakes modules C1 and B are assembled as shown in FIG. 7.

The clutch armature 56 or 62 and the brake armature 95 are positioned axially along the grooves 99 by suitable devices 105 (FIG. 4) which operate automatically in service use to take up wear at the friction faces of the brake or clutch and maintain a uniform gap 106 of the desired narrow width between these faces when the coupling is disengaged.

Output shaft module A

Except for omission of the magnet 91 and the armature 96 and reversal of the devices 105 when a clutch armature 56 or 62 is placed on the collar 100, this module (see FIG. 6), is identical in construction with the brake module B, the corresponding parts being indicated by the same reference numerals. Thus, the grooves 99 in the collar 100 are long enough to receive the armature 56, or 62, of the C1 and C2 modules and support the same through the devices 105 near the inner end of the collar for proper association with the clutch modules as an incident to assembling pairs of modules as shown in FIGS. 7–10 as will be described later.

Attachment of output modules A or B to standard power take-off devices

The versatility of the present modular system is increased substantially by adaptation of the brake module B and also the output shaft module A for the direct attachment to the housings of standardized speed reducers, gearing, and other power take-off devices which themselves are adapted for direct mounting on the end of a NEMA motor as shown in FIG. 17. This is accomplished by making the outer end face of the casing 83 of standard NEMA construction. (See FIGS. 4 and 6.) Thus, a male pilot 117 of standard NEMA dimensions projects from an end face or shoulder 118 and is located accurately relative to threaded screw holes 119, the same as the holes 29 of a NEMA motor face. Likewise, the length and size of the shaft 90 and its key 90a conform to the same standard.

Module D for foot mounting

As shown in FIGS. 1, 9 and 10, this standardized base comprises two flanges 125 upstanding from opposite ends of a flat base plate 126 and spaced apart a distance equal to the spacing of the outer end faces 79 and 118 of the casings 58 and 83 which are assembled to form the clutch 14 (FIGS. 1 and 10) and the clutch-brake 13 (FIGS. 1 and 9) combinations intended for foot mounting separate from a motor. The upper ends 127 of the flanges are curved to fit around the pilot surfaces 78 and 117 on the casing ends and temporarily support the two module assemblies with the bolt circles thereof coinciding with holes 128 angularly spaced around the flange ends to match the holes 80 and 119 of standard NEMA size and spacing in the casings. The flanges may be clamped to casing ends by cap screws 81 and 129 threaded into the casing holes. Four somewhat elongated and parallel slots 130 are formed in the base plate 126 near the corners thereof to receive bolts for fastening the bracket to a desired support for service use of the assembly.

Module E for motor mounting

The two modules C1, B or C1, A combinations when bolted together as above described may themselves be utilized to support a NEMA motor cantilever fashion as shown at 15 and 16 in FIG. 1. This is accomplished through the use of the module E which comprises one or more flat base plates 133, an integral flange 134 upstanding from one end and triangular webs 135 integrally joining the flange 134 with the plates 133 to form a bracket of rigid truss structure. The webs are spaced to receive the lower portion of the module assembly between them. At its upper edge, the flange is curved as indicated at 136 to fit around the NEMA end pilot 117 on the B and A modules when holes 137 in the flange are in register with the lower two or more of the NEMA screw holes 119 on these modules. Parallel slots 138 near the corners of the plate are adapted to receive bolts for clamping the bracket to a desired support for service use.

Motor mounted assemblies

After preforming a stock of power input and output assemblies A, B, C1 and C2 constructed as above described, assume that it is desired to form a clutch assembly such as shown in FIG. 8 and mount the same on a standard NEMA motor. In accordance with the present invention, the next step involves the selection of one of the A modules and one of the C1 modules. The assembly and mounting on the motor is effected by fitting the casing 31 of the C1 unit onto the pilot surface 24 of the motor. The hub 53 is fitted onto and becomes keyed to the end of the motor shaft. After alining the holes 34 of the casing ring 31 with the holes 29 of the motor end bell, the ring 31 is clamped to the end bell by inserting and tightening the screws 35. Then, the selected A module is telescoped onto the pilot surface 37 of the ring 31 thus bringing the casing ring or cup 84 into abutment with the ring 31 and the armature 56 into close proximity with the face of the driving friction ring 45. The assembly, as shown in FIG. 8, is completed by inserting and tightening the screws 112.

If the motor mounted assembly is to be a clutch-brake combination, it is only necessary to select a B instead of the A module carrying thereon the magnet 91 and the adjacent armature 94. The same procedure above described is followed in using the C1 and B units to form the clutch-brake assembly shown in FIG. 7.

Foot mounted assemblies

Where the two module assembly, a clutch 14 (FIGS. 1 and 10) or a clutch-brake 13 (FIGS. 1 and 9) is to be mounted for service use through the medium of a base module D, a clutch module C2 is used in combination with an A or B output module. If a clutch-brake assembly 13 (FIGS. 1 and 9) is to be formed, the B module is equipped with two armatures 62 and 95 positioned along the spline grooves 99 of the collar 100 in the manner above described. This module is moved axially toward the open end of the C2 module and the pilot surface 113 on the casing flange 84 is telescoped onto the male pilot 37 of the casing 58 thus centering the two casings accurately. With the flange end 114 in abutment with the shoulder 59 and the holes 42a and 111 in alinement, the screws 112 are inserted through the casing 84 and threaded into the holes 42a thus completing the joint 21 and securing the modules together rigidly.

The assembly thus formed is placed on a base module D between the flanges 125 and the lower portion of the annular pilot surfaces 78 and 117 seated in the curved flange ends 127. After turning the assembly to aline the holes, the screws 81 and 129 are inserted and threaded into the holes 80 and 119 to complete the mounting as shown in FIG. 9.

If the assembly is to be a foot-mounted clutch 14 (FIGS. 1 and 9), the same procedure is followed except that an A module is used for the output end of the assembly.

Motor mounting assemblies

Where a NEMA motor without its own mounting base is to be used and supported solely from a base, a clutch or a clutch-brake assembly, the mounting bracket E (FIG. 1) is employed as the supporting base. For this purpose, the input shaft module is assembled on and secured to the motor end as described above after which the output module is bolted on an the two module assembly placed between the upstanding flanges 135 of the E bracket with the pilot 117 at the output end of the assembly seated in the curved upper end 136 of the bracket flange 134. Then, after aligning the holes 119 on the B or A module with the bracket holes 137, screws 155 (FIG. 1) are inserted and threaded into the holes 119 to clamp the assembly rigidly to the bracket E. Assemblies 15 and 16 (FIG. 1) may thus be formed and adapted for attachment to a suitable support by bolts extended through the holes 138 in the base plate of the bracket E.

Advantages

The improved modular method of constructing magnetic friction couplings as above described possesses numerous advantages not only to the manufacturer and its sales offices in different localities but especially to the ultimate purchaser and user of individual couplings or small quantities thereof. Thus, the comparatively small number of the modules A–E with the many duplicated parts may be manufactured on a high production basis and therefore at low cost and stocked in various locations in accordance with the anticipated future needs of the manufacturer's sales offices or of manufacturers of NEMA motors, gear reducers, etc. From such conveniently available stocks, the modules required to construct a particular coupling for either a NEMA or standard base mounting may be selected and assembled quickly for installation in a desired machine location. As a result, the purchaser obtains immediate delivery of any one of a variety of couplings with dimensional and mounting tolerances already built in, the selected assembly being ready for quick and low cost mounting and coupling to the operating parts of a machine. The saving to the end user is increased because all of the motor mounted modular combinations are adapted for NEMA motors having only one projecting shaft end and therefore obtainable at minimum cost.

We claim as our invention:

1. The method of constructing magnetic friction clutches or clutch-brake combinations for alternative mountings in service use including the steps of:
   (a) preforming a first power input unit comprising a ring-like casing adapted at a first end to interfit closely with and for bolting to an electric motor end bell having a male pilot surface, a circle of bolt holes and a projecting shaft all of predetermined sizes and dimensions, said casing enclosing a hub for spline coupling with the shaft of said motor and carrying the driving pole ring of an axially engageable friction clutch energized by a magnet within the casing, the opposite second end of the casing having a cylindrical pilot surface concentric with the casing axis,
   (b) preforming a second power input unit duplicating said first unit except for the mounting of said pole ring on the inner end of a shaft journaled intermediate its ends in said first casing end,
   (c) preforming a first power output unit comprising a cup-shaped casing and a shaft journaled intermediate its ends in the bottom of the cup along the axis thereof and carrying a spline coupled to a driven armature ring adapted, when said cup is alined and abutting one of said input rings, for axial gripping engagement with the driving ring of the input unit, the open end of said cup having a cylindrical pilot surface concentric with the output shaft and adapted to telescope closely with said cylindrical pilot surface on said input unit,
   (d) preforming a second power output unit duplicating the first output unit except for the addition within the cup thereof of a magnetic friction brake having an armature ring splined onto said output shaft between said driven clutch ring and the cup bottom and a magnet ring fixed to said cup and adapted for axial gripping engagement with the armature ring,
   (e) selecting one of said input units according to whether a motor or base mounted transmission is to be formed,
   (f) selecting one of said output units according to whether the transmission is to be a clutch or a clutch-brake combination,
   (g) bringing the casings of the selected power input and output units into abutment with the cylindrical pilot surfaces thereof telescoped with each other whereby to aline the driving and driven rings of said clutch and dispose the same for axial gripping engagement,
   (h) and finally bolting the abutting casings together.

2. The method as defined in claim 1 of constructing a clutch or a clutch-brake transmission mounted on the end bell of a selected motor having a male pilot surface, a circle of bolt holes, and a projecting shaft all of predetermined sizes and dimensions, the first power input unit having been selected in step (e) said method including the further steps of
   (1) first telescoping the casing of said first power input unit onto the shaft and the male pilot surface of the motor with the hub of said driving friction ring splined onto the motor shaft,
   (2) clamping the casing to the motor end bell by screws extending through the matching holes of the casing and end bell,
      step (g) includes telescoping the cup of the selected output unit onto the cylindrical pilot surface of the motor mounted input unit, and
      step (h) includes bolting the casing and cup of the input and output units together and in abutment to form a rigid assembly supported solely by said motor end bell.

References Cited

UNITED STATES PATENTS

| | | | |
|---|---|---|---|
| 2,796,658 | 6/1957 | Aller | 29—407 X |
| 2,869,228 | 1/1959 | Martin | 29—469 X |
| 3,240,302 | 3/1966 | Van Tuyl | 192—18 |
| 3,246,725 | 4/1966 | Brashear | 29—155.5 X |
| 3,252,212 | 5/1966 | Bell | 29—407 |
| 3,274,745 | 9/1966 | McManus et al. | 29—469 X |

CHARLIE T. MOON, *Primary Examiner.*